United States Patent [19]
Beau et al.

[11] Patent Number: 4,566,740
[45] Date of Patent: Jan. 28, 1986

[54] KINETIC WHEEL ARRANGEMENT INCORPORATING MAGNETIC SUSPENSION PROVIDED WITH MEANS FOR CAGING ITS ROTOR

[75] Inventors: Jean F. Beau, St. Ouen-L'Aumone; Michel Gauthier, Verneuil-Sur-Seine, both of France

[73] Assignee: Societe Nationale Industrielle et Aerospatiale, Paris, France

[21] Appl. No.: 629,215

[22] Filed: Jul. 9, 1984

[30] Foreign Application Priority Data

Jul. 19, 1983 [FR] France .................. 83 11903

[51] Int. Cl.$^4$ .............................. F16C 39/00
[52] U.S. Cl. ......................... 308/10; 310/74
[58] Field of Search ............... 310/74; 308/10

[56] References Cited

U.S. PATENT DOCUMENTS

| | | | |
|---|---|---|---|
| 3,453,465 | 7/1969 | DeBoer et al. | 310/74 X |
| 3,955,858 | 5/1976 | Poubeau | 308/10 |
| 4,211,452 | 7/1980 | Poubeau | 308/10 |
| 4,363,525 | 12/1982 | Poubeau | 308/10 |

Primary Examiner—Donovan F. Duggan
Attorney, Agent, or Firm—Marshall, O'Toole, Gerstein, Murray & Bicknell

[57] ABSTRACT

The present invention relates to a kinetic wheel arrangement comprising a stator, a rotor and a magnetic suspension, wherein said rotor comprises a central recess about said axis of rotation; there is disposed in said central recess of the rotor a pressure system provided with a screw which is connected to the stator and of which the axis merges with said axis of rotation of the rotor, this pressure system being adapted to take a first position for which said rotor is free to rotate about its axis of rotation while being suspended by its magnetic suspension, and a second position for which it presses said rotor against said stator to immobilize it; and remotely-controlled means are provided to cut said screw between said stator and said rotor. The invention is particularly applicable to the caging of the rotor in phases during which the kinetic wheel arrangement undergoes considerable mechanical stresses.

10 Claims, 2 Drawing Figures

KINETIC WHEEL ARRANGEMENT INCORPORATING MAGNETIC SUSPENSION PROVIDED WITH MEANS FOR CAGING ITS ROTOR

The present invention relates to a kinetic wheel arrangement incorporating magnetic suspension.

Kinetic wheel arrangements of this type are known to comprise a stator and a rotor, at least one magnetic bearing formed by cooperating parts respectively connected to the stator and to the rotor to be adapted to suspend the rotor magnetically with respect to the stator, the axis of rotation being defined by the stator. These magnetic suspension arrangements are provided so that, in normal operation, the rotor rotates in levitation without contact with respect to the stator. Moreover, at least one mechanical back-up bearing is provided to enable the stator to ensure a connection for rotation for the rotor when the latter is not magnetically suspended.

In kinetic wheel arrangements incorporating magnetic bearing, the rotor is thus not rigidly connected to the stator, but, on the contrary, is free to move, to a certain extent, both parallel and at right angles to its axis of rotation. This freedom of displacement of the rotor is opposed by the magnetic forces created by said suspension only when the magnetic suspension is active.

Difficulties therefore arise when a kinetic wheel arrangement is subjected, as a whole, to considerable mechanical stresses, as is the case for example for a kinetic wheel arrangement mounted on board an artificial satellite and having to undergo the effects of vibrations during the satellite launching phase, without damage.

It is an object of the present invention to overcome this drawback and to provide a device capable of ensuring mechanical caging which immobilizes the rotor with respect to the stator, whilst the positioning of the rotor with respect to its axis of rotation is not ensured by magnetic suspension. It will be noted that such a caging device must be as simple as possible so as to be reliable and sure. It must also be as small and as light as possible, as this device is of no use during the duration of operation of the satellite in orbit. Furthermore, its structure must enable it:

to be actuated manually and reversibly several times during ground tests;

to be automatically actuated by remote-control, once, in orbital phase, without possibility of human intervention, with a view to neutralizing it.

To these ends, according to the invention, the kinetic wheel arrangement comprising a stator, a rotor and a magnetic suspension formed by cooperating parts respectively connected to the stator and to the rotor to be adapted to suspend the rotor magnetically with respect to the stator, the axis of rotation of the rotor being defined by the stator, is noteworthy in that said rotor comprises a central recess about said axis of rotation, in that, in said central recess of the rotor there is disposed a pressure system provided with a screw which is connected to the stator and of which the axis merges with said axis of rotation of the rotor, this pressure system being adapted to take a first position for which said rotor is free to rotate about its axis of rotation whilst being suspended by its magnetic suspension, and a second position for which it presses said rotor against said stator to immobilize it, and in that remotely-controlled means are provided to cut said screw between said stator and said rotor.

Thanks to the pressure system incorporating a screw, the caging device can thus be actuated as many times as is desired, in reversible manner. Furthermore, thanks to the means for cutting the screw by remote-control, the rotor may be definitively released, in orbital phase.

Said remotely controlled means for cutting the screw of the pressure system are preferably constituted by an electrically controlled squib, i.e. one comprising a cutting tool actuated by an explosive charge fired by an electrical signal.

The pressure system may present numerous different configurations. However, in an advantageous embodiment, the screw is anchored in the stator and cooperates with a nut which controls the displacement of a pressure piece along said screw. In order to be guided in translation, said pressure piece is housed with slight clearance in a central recess in the stator. A compression spring may be disposed between the compression piece and the stator to separate said compression piece from the latter when said nut is unscrewed.

In the event of said rotor comprising a peripheral rim, it is advantageous if, in position of caging of the rotor, this rim bears against a corresponding peripheral stop on the stator. Stops may also be provided on the stator and on the rotor, in the vicinity of the axis of rotation of the latter, to cooperate in position of caging of the rotor, for example at the moment of obtaining a nominal tightening torque greater than the tightening torque enabling cooperation of the peripheral stops to be obtained.

The pressure system may abut on the rotor, at any point in the vicinity of the central recess thereof. In the event of the rotor comprising a mechanical back-up bearing in this central recess, the pressure system advantageously abuts on the inner ring of such a bearing.

The invention will be more readily understood on reading the following description with reference to the accompanying drawings, in which.

In these Figures, like reference designate like elements.

Figure 1:
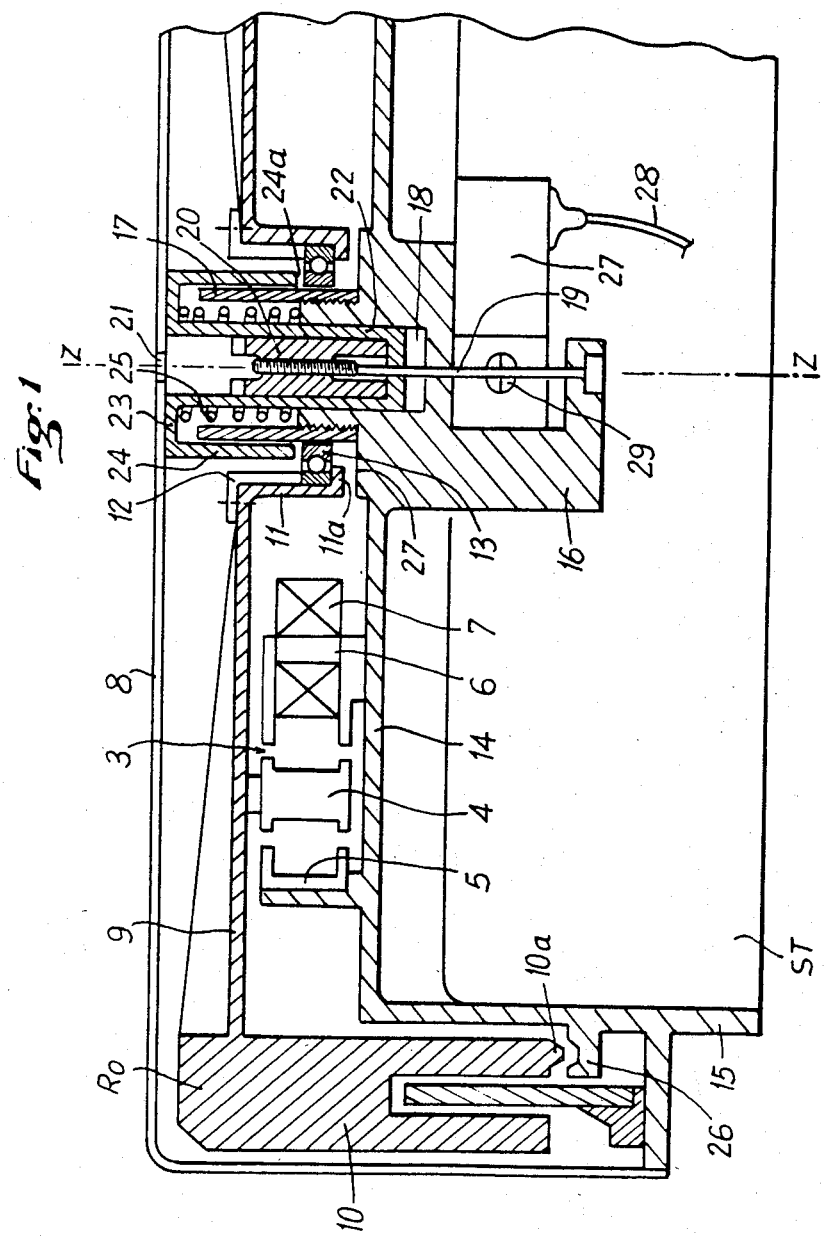
FIG. 1 is a schematic, partial view in axial section of a kinetic wheel arrangement according to the present invention.

Referring now to the drawings, the kinetic wheel arrangement shown schematically and partially in FIG. 1, comprises a stator ST and a rotor Ro, adapted to rotate about an axis Z—Z. The rotor Ro may be suspended magnetically with respect to the stator ST and, to this end, at least one magnetic bearing 3 is provided. In the example shown in FIG. 1, the magnetic bearing 3 (which may be of any other known structure) comprises a magnetized ring 4 fast with the rotor Ro and disposed between a ferromagnetic ring 5 and annular polar pieces 6, borne by the stator ST. The polar pieces 6 are provided with coils 7.

The rotor Ro is enclosed in a casing 8 abutting on the stator ST. This rotor presents the form of a disc 8, of axis Z—Z, fast on its periphery with a rim 10 and in the vicinity of its center with a sleeve 11, surrounding axis Z—Z and maintaining, with the aid of a tightening piece 12, a mechanical back-up bearing 13. The mechanical bearing 13 is fixed on the sleeve 11 by its outer ring. The magnetized ring 4 of the magnetic bearing 3 is borne by the disc 9.

The stator ST comprises a face 14, bearing elements 5, 6 and 7 of the magnetic bearing 3, at right angles to axis Z—Z and disposed opposite the disc 9 of the stator Ro. The stator ST further comprises a peripheral wall 15, of axis Z—Z, inside the rim 10, and a central core 16, provided with a bush 17, likewise of axis Z—Z, inside the sleeve 11 and surrounded, with clearance, by the mechanical bearing 13. If necessary, the inner ring of the mechanical bearing 13 may come into contact with the bush 17 to ensure a mechanical connection for rotation between the rotor Ro and the stator ST.

The stator ST comprises a central recess 18 (of axis Z—Z) and a threaded rod 19 disposed centrally in said recess and fast at one of its ends with said stator. On the threaded rod 19 there may be screwed a cylindrical nut 20, accessible from the outside by a tool (not shown) via a hole 21 provided in the casing 8.

Between the inner wall of the central recess 18 and the nut 20 there is disposed a bush 22, provided with a flange 23 opposite the casing 8, said flange 23 being extended by a peripheral raised edge 24 outside the bush 17 and directed in the direction opposite said casing 8. A compression spring 25 is housed between the bushes 17 and 22 and abuts on one side on the central core 16 and on the other side on the flange 23.

The bush 22 may slide with slight clearance in the recess 18, whilst the nut 20 may rotate with slight clearance in the bush 22.

In position of normal operation of the kinetic wheel arrangement according to the invention, the flange 23 of the bush 22 is in abutment against the inner face of the casing 8, the spring 25 is relaxed and rotation of the rotor Ro is free.

When it is desired to cage rotor Ro with respect to stator ST, an appropriate tool is introduced through the hole 21 in the casing 8 and the nut 20 is screwed. The latter then drives the assembly 22, 23, 24 in the direction of the stator, against the action of the spring 25, which is compressed. At one stage of screwing of the nut 20, the free edge 24a of the raised edge 24 meets the inner ring of the mechanical bearing 13 and, from that moment, the rotor Ro is itself displaced in the direction of the stator ST by the action on nut 20. At the end of tightening, the free edge 10a of the rim 10 comes into abutment on a stop 26 borne by the peripheral wall 15 of the stator ST. If the nut 20 continues to be tightened until a nominal torque is obtained, the free edge 11a of the sleeve 11 comes into abutment on a bearing surface 27, provided to this end on the core 16.

If, from the caged position of the rotor thus obtained, the nut 20 is unscrewed, the assembly 22, 23, 24 resumes its initial position shown in FIG. 1 under the action of the spring 25. As for rotor Ro, it resumes its position of equilibrium, under the action of the axial return force of its magnetic bearing 3.

Thanks to the device according to the present invention, it is thus possible to cage and to uncage the rotor with respect to the stator as many times as is necessary.

A squib 27, controlled by conductors 28, is moreover provided in order definitively to release the rotor Ro by remote-control.

When rotor Ro is in caged position against stator ST, control of the squib 27 actuates the cutter 29 thereof (seen in end view in the figures) which cuts the rod 19 between its anchoring on the stator ST and the assembly 20, 22, 23, 24. After cut, this assembly, with the free cut part of the rod 19, returns into initial position under the action of spring 25. Decaging has then become irreversible.

Figure 2:
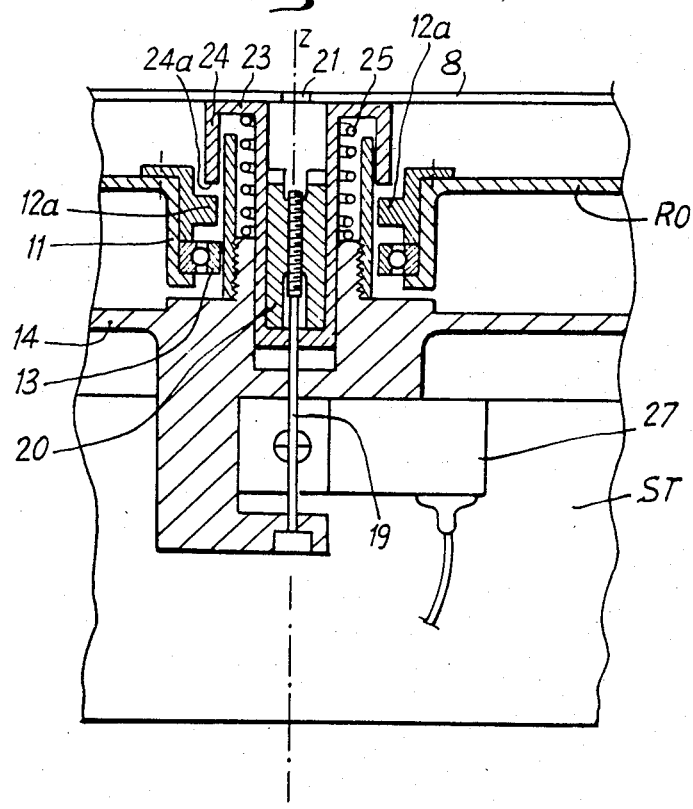
FIG. 2 illustrates a variant of the arrangement of FIG. 1

The variant embodiment of FIG. 2 is substantially identical to the device of FIG. 1. The only difference lies in that the tightening piece 12, maintaining the mechanical bearing 13 against the sleeve 11, comprises a stop 12a with which the free edge 24a of the raised edge 24 cooperates to press the rotor towards its caged position. In that case, the edge 24a therefore does not abut on the inner ring of the bearing 13, but on this stop 12a.

What is claimed is:

1. In a kinetic wheel arrangement comprising a stator, a rotor and a magnetic suspension formed by cooperating parts respectively connected to the stator and to the rotor to be adapted to suspend the rotor magnetically with respect to the stator, the axis of rotation of the rotor being defined by the stator, said rotor comprises a central recess about said axis of rotation, there is disposed in said central recess of the rotor a pressure system provided with a screw which is connected to the stator and of which the axis merges with said axis of rotation of the rotor, this pressure system being adapted to take a first position for which said rotor is free to rotate about its axis of rotation whilst being suspended by its magnetic suspension, and a second position for which it presses said rotor against said stator to immobilize it, and remotely-controlled means are provided to cut said screw between said stator and said rotor.

2. The kinetic wheel arrangement of claim 1, wherein said remotely controlled means for cutting the screw are constituted by an electrically controlled squib.

3. The kinetic wheel arrangement of claim 1, wherein the screw is anchored in the stator and cooperates with a nut which controls the displacement of a pressure piece along said screw.

4. The kinetic wheel arrangement of claim 3, wherein said pressure piece is housed with slight clearance in a central recess in the stator.

5. The kinetic wheel arrangement of claim 3, wherein a compression spring is disposed between the compression piece and the stator.

6. The kinetic wheel arrangement of claim 1, in which the rotor comprises a peripheral rim, wherein, in caged position of the rotor, said peripheral rim bears against a peripheral stop on the stator.

7. The kinetic wheel arrangement of claim 1, wherein it comprises stops provided on the rotor and on the stator, in the vicinity of the axis of rotation, to cooperate when the rotor is in caged position.

8. the kinetic wheel arrangement of claim 3, wherein the pressure system abuts on the rotor in the vicinity of the central recess thereof.

9. The kinetic wheel arrangement of claim 8, in which the rotor comprises a mechanical back-up bearing in the central recess, wherein the pressure system bears on the inner ring of said bearing.

10. The kinetic wheel arrangement of claim 8, in which the rotor comprises a mechanical back-up bearing disposed in the recess and connected to the rotor by a tightening piece, wherein the pressure system bears on said tightening piece.

* * * * *